United States Patent
Ku (10) Patent No.: US 10,095,884 B2
(45) Date of Patent: Oct. 9, 2018

(54) SYSTEM AND METHOD FOR USING CUSTOMER INFORMATION IN ELECTRONIC COMMERCE

(75) Inventor: Young Bae Ku, Seoul (KR)

(73) Assignee: EBAY KOREA CO., LTD., Seoul (KR)

( * ) Notice: Subject to any disclaimer, the term of this patent is extended or adjusted under 35 U.S.C. 154(b) by 0 days.

(21) Appl. No.: 12/570,738

(22) Filed: Sep. 30, 2009

(65) Prior Publication Data

US 2010/0088191 A1 Apr. 8, 2010

(51) Int. Cl.
*G06Q 30/06* (2012.01)
*G06F 21/60* (2013.01)
*G06F 21/62* (2013.01)
*G06Q 50/26* (2012.01)

(52) U.S. Cl.
CPC ..... *G06F 21/6263* (2013.01); *G06Q 30/0601* (2013.01); *G06Q 50/265* (2013.01)

(58) Field of Classification Search
None
See application file for complete search history.

(56) References Cited

U.S. PATENT DOCUMENTS

| | | | |
|---|---|---|---|
| 6,381,629 B1 * | 4/2002 | Lee | G06F 17/30286 707/999.01 |
| 6,738,788 B1 * | 5/2004 | Horng | G06F 17/30286 360/234.4 |
| 7,123,900 B2 * | 10/2006 | Brown et al. | 455/410 |
| 7,188,095 B2 * | 3/2007 | Saika | |
| 7,225,157 B2 * | 5/2007 | Howard et al. | 705/51 |
| 7,941,376 B2 * | 5/2011 | Peckover | 705/50 |
| 8,181,246 B2 * | 5/2012 | Shulman et al. | 726/22 |

(Continued)

FOREIGN PATENT DOCUMENTS

| CN | 101719254 B | 7/2013 |
|---|---|---|
| CN | 103500313 B | 8/2016 |

(Continued)

OTHER PUBLICATIONS

Chong, Frederick et al., Multi-Tenant Data Architecture, Jun. 2006, Microsoft Corporation, pp. 1-26.*

(Continued)

*Primary Examiner* — Ethan D Civan
*Assistant Examiner* — Ming Shui
(74) *Attorney, Agent, or Firm* — Schwegman Lundberg & Woessner, P.A.

(57) ABSTRACT

A system and method for using customer information in electronic commerce using the Internet are provided. The system includes a customer information database (DB) for storing a unique number for each customer, an integrated customer information DB for storing actual customer information corresponding to the unique number in an integrated manner, and a management server for providing the unique number stored in the customer information DB and providing the actual customer information corresponding to the unique number under a security condition when an external terminal requests customer information. Actual customer information can be effectively prevented from being easily leaked by hackers or malicious programs and customer information can be utilized without a security issue.

15 Claims, 4 Drawing Sheets

(56) References Cited

U.S. PATENT DOCUMENTS

| | | | |
|---|---|---|---|
| 8,359,271 B2* | 1/2013 | Peckover | 705/50 |
| 2001/0027439 A1* | 10/2001 | Holtzman et al. | 705/39 |
| 2005/0021791 A1* | 1/2005 | Sakiyama et al. | 709/229 |
| 2007/0033174 A1* | 2/2007 | Cornacchia, III | 707/3 |
| 2007/0152041 A1* | 7/2007 | Hawkins | 235/383 |
| 2008/0140991 A1* | 6/2008 | Pandya | 712/37 |
| 2008/0222319 A1 | 9/2008 | Sato et al. | |
| 2009/0043817 A1* | 2/2009 | Sanders | G06Q 10/10 |
| 2009/0163174 A1* | 6/2009 | Baik et al. | 455/410 |
| 2009/0193026 A1* | 7/2009 | Andersson et al. | 707/9 |
| 2009/0240620 A1* | 9/2009 | Kendrick et al. | 705/39 |
| 2010/0106645 A1* | 4/2010 | Peckover | 705/50 |

FOREIGN PATENT DOCUMENTS

| | | |
|---|---|---|
| JP | 2000330963 A | 11/2000 |
| JP | 2002236571 A | 8/2002 |
| JP | 2004318391 A | 11/2004 |
| JP | 2005071054 A | 3/2005 |
| JP | 2006011524 A | 1/2006 |
| JP | 200571054 A | 9/2006 |
| JP | 200611524 A | 8/2007 |
| JP | 2007280261 A | 10/2007 |
| JP | 2008217425 A | 9/2008 |
| KR | 1020070029537 A | 3/2007 |
| SG | 179536 A | 4/2012 |

OTHER PUBLICATIONS

Primary Keys: IDs versus GUIDs, Jeff Atwood, https://blog.codinghorror.com/primary-keys-ids-versus-guids/ (Year: 2007).*
The Quick Guide to GUIDs—BetterExplained, https://betterexplained.com/articles/the-quick-guide-to-guids/.*
Soho-Expert 2009.
"Chinese Application No. 201310238336.7, Office Action dated Oct. 8, 2015", with English translation of claims, 15 pgs.
"Chinese Application Serial No. 201310238336.7, Response filed Feb. 6, 2016 to Office Action dated Oct. 8, 2015", with English translation of claims, 13 pgs.

* cited by examiner

| Customer Number | Unique Number |
|---|---|
| 243897 | a123456 |
| 254321 | a123457 |
| | |

FIG. 2B

Customer Information DB

| Customer Number | ID | Name Unique Number | Resident Registration Number Unique Number | Home Telephone Unique Number | Company Telephone Unique Number |
|---|---|---|---|---|---|
| 243897 | Gmarket01 | a123456 | a12345600 | a12345601 | a12345602 |
| 254321 | Gmarket02 | a123457 | a12345700 | a12345701 | a12345602 |
|  |  |  |  |  |  |

FIG. 2C

Integrated Customer Information DB

| Customer Number | ID | Name | Resident Registration | Home Telephone | Company Telephone |
|---|---|---|---|---|---|
| 243897 | Gmarket01 | Hong Gil-Dong | 780102-1111111 | 02-489-1234 | 02-585-1234 |
| 254321 | Gmarket02 | Kim Gil-Dong | 801101-1111111 | 02-489-1235 | 02-585-1241 |
|  |  |  |  |  |  |

FIG. 3

SYSTEM AND METHOD FOR USING CUSTOMER INFORMATION IN ELECTRONIC COMMERCE

CROSS-REFERENCE TO RELATED APPLICATION

This application claims the benefit of priority under 35 U.S.C. § 119 from Korean Patent Application No. 10-2008-0097548, filed on Oct. 6, 2008, the contents of which are hereby incorporated herein by reference in its entirety.

BACKGROUND

1. Field

The present invention relates to an electronic commerce system and method using the Internet, and more particularly, to a system and method for storing a unique number in a customer information DB and actual customer information corresponding to the unique number in an integrated customer information DB, and, upon receipt of a request for customer information from an external terminal, providing the unique number stored in the customer information DB, and providing the actual customer information corresponding to the unique number under a security condition, in processing customer information received from customer terminals connected via the Internet.

2. Description of the Related Art

Recent development of the Internet has led to an increase in electronic commerce for on-line purchase of goods. Such electronic commerce has branched out from household goods and electronic products to include a wide variety of goods.

The electronic commerce has been developed from an enhanced communication network, and particularly, to provide other benefits that sellers and buyers cannot obtain in traditional transaction systems.

That is, sellers need no store or separate large warehouse for goods storage, thus reducing facility budget and lowering the price of goods, and buyers can conveniently shop without the trouble of visiting a store and purchase goods at a lower price.

In an on-line shopping mall website performing such electronic commerce, when a customer purchases goods or services on the Internet, personal information of the customer is input on a web browser for goods delivery, service execution and payment, the input personal information of the customer is encrypted, and payment information is sent to a credit card company or bank. Simultaneously, detailed information on the customer (seller or buyer) such as purchase content, an address, a telephone number and the like, are sent to a server of the shopping mall web site over the Internet. When the customer subscribes as a member, personal information of the customer is stored in a customer database (DB) of the server.

In general, when a customer subscribes as a member, personal information of the customer that is written and sent on a web browser of a customer terminal includes, for example, an ID, a password, a name, an address, a telephone number, and a resident registration number, which are required by most shopping mall sites. The personal information may selectively include a company name, a position in the company, a cell phone number, and hobbies.

The customer subscribes as a member and the personal information of the customer is stored in the customer DB interworking with the server of the web site performing electronic commerce, as described above. When the customer additionally purchases or sells goods or services over the Internet, the personal information of the customer is output on a web browser of a customer terminal for convenience of the customer, so that the customer need only write a type or number of goods. This overcomes inconvenience of directly writing the personal information of the customer.

However, when the customer DB of the electronic commerce website with low security is hacked by a hacker, that is, when personal information of customers, i.e., information such as an address, a resident registration number, and a credit card number are defenselessly leaked in one hacking operation, a broker performing electronic commerce with the customers may be severely damaged. Accordingly, both sellers and buyers are reluctant to store personal information of customers in the server.

To resolve this problem, a variety of schemes of protecting customer information in electronic commerce have been developed. A recent severe problem is high probability of leakage of customer information provided when the customer information is requested by a seller terminal or a delivery authority.

Also, as electronic commerce using mobile terminals increases, there have been efforts to reduce a data transmission amount.

SUMMARY OF THE INVENTION

The present invention is directed to a system and method capable of effectively preventing detailed information of customers received from customer terminals connected over the Internet from being leaked by hackers or malicious programs.

The present invention is also directed to a system and method capable of using customer information more effectively and with security.

The present invention is also directed to a system and method for enabling more effective mobile electronic commerce by delivering customer information using a unique number as a reduced data transmission amount becomes critical in electronic commerce using mobile terminals.

According to an aspect of the present invention, there is provided a system for using customer information in electronic commerce using the Internet, including: a customer information database (DB) for storing a unique number for each customer; an integrated customer information DB for storing actual customer information corresponding to the unique number in an integrated manner; and a management server for providing the unique number stored in the customer information DB and providing the actual customer information corresponding to the unique number under a security condition when an external terminal requests customer information.

The management server may provide the actual customer information as information capable of being only output on a screen or printed.

The management server may temporarily store the actual customer information in a separate temporary table when the management server is not normally connected with the integrated customer information DB, and then store the temporarily stored actual customer information in the integrated customer information DB when the management server is normally connected with the integrated customer information DB.

Meanwhile, the customer information DB may include different unique numbers according to a customer address, a customer telephone number, and a customer resident registration number, and the integrated customer information DB may store the actual customer information corresponding to each unique number in an integrated manner.

According to another aspect of the present invention, there is provided a system for using customer information in electronic commerce using the Internet, including: a customer information DB for storing a unique number for each customer; an integrated customer information DB for storing actual customer information corresponding to the unique number in an integrated manner; and a management server for determining whether to provide the unique number or the actual customer information when an external terminal requests customer information, providing the unique number stored in the customer information DB when it is determined that the unique number is to be provided and providing the actual customer information corresponding to the unique number when it is determined that the actual customer information is to be provided.

Meanwhile, the management server may determine whether the request is made by an entity providing the actual customer information, and provide the actual customer information when it is determined that the request is made by an entity providing the actual customer information and the unique number when it is determined that the requested is not made by an entity providing the actual customer information. Also, the management server may determine whether the request is made by an entity providing the actual customer information, and provide the actual customer information as information capable of being stored and transmitted when it is determined that the request is made by an entity providing the actual customer information.

When identifier information is received together with the unique number from the external terminal, the management server may provide the actual customer information when the identifier information satisfies a predetermined condition.

According to still another aspect of the present invention, there is provided a method for using customer information in electronic commerce using the Internet to broker an on-line transaction between customers in an on-line shopping mall including terminals connected with a management server for managing the on-line shopping mall via the Internet, the method including: receiving input actual customer information and creating a unique number for each customer corresponding to the actual customer information; storing the created unique number for each customer in a separate customer information DB and separately storing the actual customer information corresponding to the unique number in an integrated customer information DB; and providing the unique number stored in the customer information DB and providing the actual customer information corresponding to the unique number under a security condition when an external terminal requests customer information.

According to yet another aspect of the present invention, there is provided a method for using customer information in electronic commerce using the Internet to broker an on-line transaction between customers in an on-line shopping mall including terminals connected with a management server for managing the on-line shopping mall via the Internet, the method including: receiving input actual customer information and creating a unique number for each customer to the actual customer information; storing the created unique number for each customer in a separate customer information DB and separately storing the actual customer information corresponding to the unique number in an integrated customer information DB; and determining whether to provide the unique number or the actual customer information when an external terminal requests customer information, providing the unique number stored in the customer information DB when it is determined that the unique number is to be provided, and providing the actual customer information corresponding to the unique number when it is determined that the actual customer information is to be provided.

According to yet another aspect of the present invention, there is provided a computer-readable recording medium having a program stored thereon for executing the method for using customer information in electronic commerce using the Internet.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

DETAILED DESCRIPTION OF EMBODIMENTS

Figure 1:
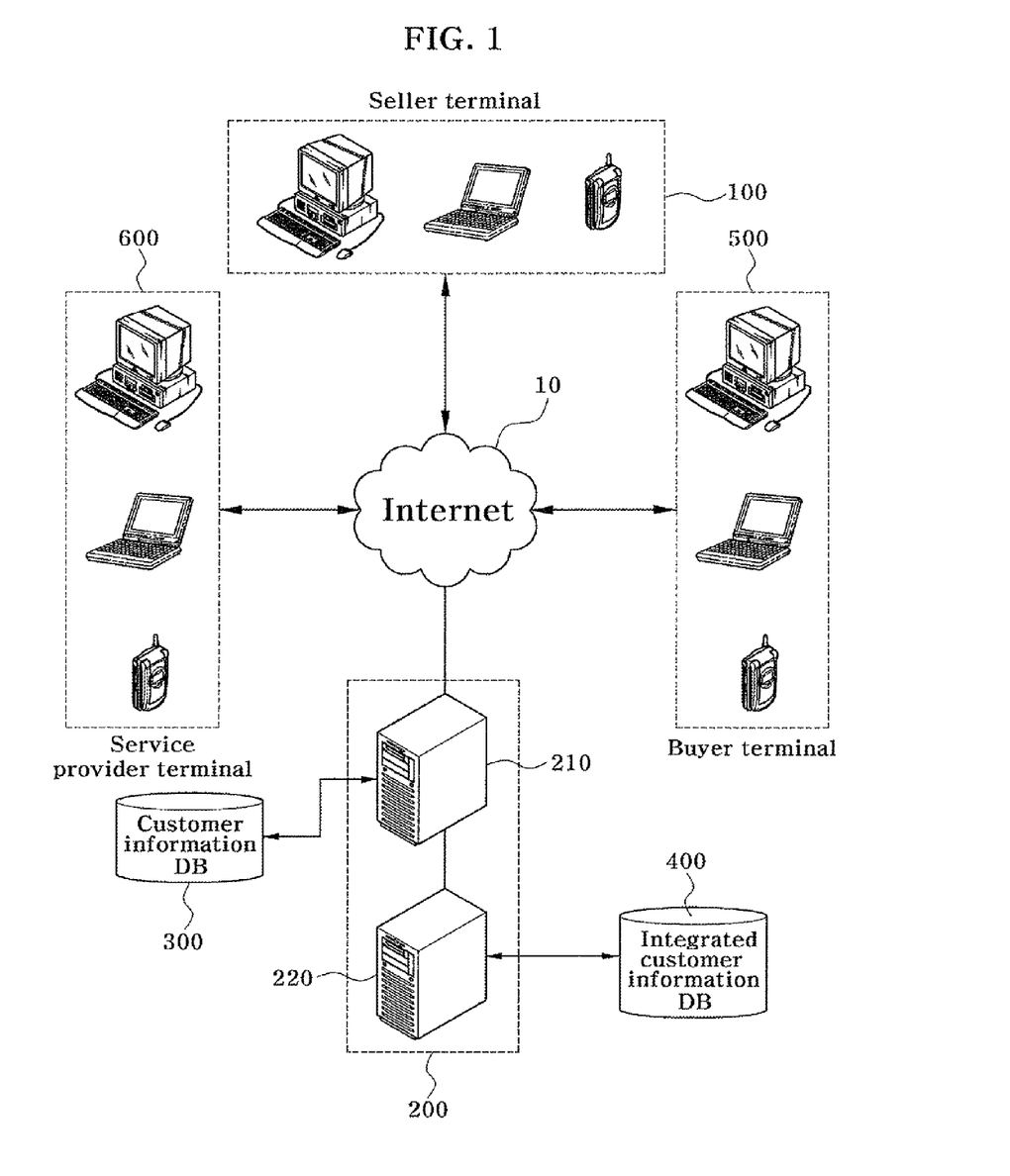
FIG. 1 is a block diagram of a system for using customer information in electronic commerce using the Internet according to an exemplary embodiment of the present invention.

FIG. 1 is a block diagram of a system for using customer information in electronic commerce using the Internet according to an exemplary embodiment of the present invention.

Referring to FIG. 1, a system for using customer information in electronic commerce using the Internet according to an exemplary embodiment of the present invention includes at least one seller terminal 100, a management server 200, a customer information database (DB) 300, an integrated customer information DB 400, a buyer terminal 500, and a service provider terminal 600. Here, these components are connected to the management server 200 over the Internet 10.

The Internet 10 refers to a worldwide open computer network that provides TCP/IP protocol and several services on the TCP/IP protocol, such as hyper text transfer protocol (HTTP), Telnet, file transfer protocol (FTP), domain name system (DNS), simple mail transfer protocol (SMTP), simple network management protocol (SNMP), network file service (NFS), and network information service (NIS). The Internet 10 provides an environment that enables the seller terminal 100, the buyer terminal 500, and the service provider terminal 600 to easily access the management server 200. Meanwhile, the Internet 10 may be wired or wireless Internet, or a core network integrated with a wired public network, a wireless mobile communication network, or mobile Internet.

For example, the seller terminal 100, the buyer terminal 500, and the service provider terminal 600 may generally be computers such as desktop personal computers (PCs) or notebook PCs, but are not limited thereto. That is, the seller terminal 100, the buyer terminal 500, and the service provider terminal 600 may be any type of wired/wireless communication devices capable of using bidirectional electronic commerce service by accessing the management server 200 over the Internet 10.

Examples of the seller terminal 100, the buyer terminal 500, and the service provider terminal 600 may include mobile terminals communicating via wireless Internet or mobile Internet, such as cellular phones, personal communications service (PCS) phones, or synchronous/asynchronous international mobile telecommunication-2000 (IMT-2000); and any wired/wireless consumer/communication devices having a user interface for accessing the management server 200 that generally manages the on-line shopping mall, such as palm PCs, personal digital assistants (PDAs), smart phones, wireless application protocol (WAP) phones, and mobile play-stations.

The seller terminal 100, the buyer terminal 500, and the service provider terminal 600 may access the management server 200 via the Internet 10 and use a sale brokering service for goods or any other services provided by the management server 200 through a communication interface for wired/wireless communication. The seller terminal 100, the buyer terminal 500, and the service provider terminal 600 may subscribe to the management server 200 as service users. Customer information registered by the subscribed customers may be stored in the customer information DB 300.

Meanwhile, the seller terminal 100 may register goods for sales or information on the seller including the seller's address using a seller management program (not shown, e.g., G-market's GSM program), which is downloaded and installed from a web server (not shown) of the management server 200 which the seller terminal 100 accesses and subscribes to. The seller terminal 100 may access a WAP server through a mobile phone.

The buyer terminal 500 may access and subscribe to the web server of the management server 200, search for and select goods desired by the buyer, perform order and payment, and request goods delivery.

The service provider terminal 600 provides additional service for a goods transaction between the seller and the buyer. In general, the service provider terminal 600 provides a delivery-related service to receive delivery request information for delivery and transmit delivery information to the management server 200. The service provider terminal 600 may also perform authentication, verification and simplification for information on the goods transaction. For used-car sales, the service provider terminal 600 confirms car information from a national car administration computing network.

The management server 200 is a service management server for generally managing the on-line shopping mall. In particular, the management server 200 receives actual customer information from the seller terminal 100 and the buyer terminal 500 connected over the Internet 10, creates a unique number for each customer corresponding to the actual customer information, stores the created unique number for each customer in the customer address DB 300, and stores the actual customer information corresponding to the unique number for each customer in the integrated customer information DB 400.

The management server 200 includes a first server 210 for receiving the actual customer information from the seller terminal 100 and the buyer terminal 500 connected over the Internet 10, creating the unique number for each customer corresponding to the actual customer information, and storing the created unique number for each customer in the customer address DB 300; and a second server 220 connected with the first server 210 for storing the actual customer information corresponding to the unique number for each customer created by the first server 210 in the integrated customer information DB 400.

The first server 210 is used as the service management server for generally managing the on-line shopping mall. The first server 210 transmits the actual customer information corresponding to the created unique number for each customer to the second server 220, and stores the created unique number for each customer in the customer address DB 300. The second server 220 receives the actual customer information corresponding to the created unique number for each customer from the first server 210 and stores the actual customer information in the integrated customer information DB 400.

Meanwhile, although not shown, a firewall for preventing hacking may be provided at an input of the first server 210 and between the first and the second servers 210 and 220.

Also, the management server 200 enables the customer information DB 300 and the integrated customer information DB 400 to be accessed through different manager accounts. This requires a hacker to attempt to hacking operation twice, thereby effectively preventing the actual customer information from being easily leaked by hackers or malicious programs.

When actual customer information for a seller and a buyer input from the seller terminal 100 and the buyer terminal 500 match, for example, when the customer is a seller and a buyer, the management server 200 creates the unique number and stores the created unique number in the customer information DB 300, and stores actual customer information corresponding to the unique number in the integrated customer information DB 400, thereby greatly reducing a great amount of customer information data stored in databases, i.e., the customer information DB 300 and the integrated customer information DB 400, thus efficiently operating and managing the databases and building the databases at low cost.

Upon receipt of a request for the customer information stored in the integrated customer information DB 400 from the seller terminal 100, the buyer terminal 500 or the service provider terminal 600, the management server 200 first provides the unique number stored in the customer information DB 300 and provides the actual customer information corresponding to the unique number under a security condition.

Under the security condition, the management server 200 searches for the unique number corresponding to the requested customer from the customer information DB 300, extracts the actual customer information corresponding to the searched unique number from the integrated customer information DB 400, and transmits the actual customer information to the seller terminal 100, the buyer terminal 500 or the service provider terminal 600.

In particular, in mobile electronic commerce, the actual customer information is substituted with a specific unique number for delivery of information required for the electronic commerce, thereby greatly reducing a data transmission amount.

Thus, the management server 200 can provide either the unique number or the actual customer information when the seller terminal 100, the buyer terminal 500 or the service provider terminal 600 requests customer information. This results in improved security.

In an example of general electronic commerce, when buyer terminals 500 give and receive gifts to and from each other, buyer "A" can deliver the gifts using only a unique number of buyer "B" even without knowing the actual customer information of buyer "B".

Even without knowing the actual address information of buyer "B", buyer "A" can request delivery using the unique number instead of address information of buyer "B", and a delivery authority receives the unique number. This may be particularly useful for gift delivery through mobile technology. For this, the service can be provided to only wired/wireless terminals through prior consultation with the management server 200.

However, a system may be implemented so that an actual destination address can be printed or output on a screen when it is requested by a delivery authority. The management server 200 may establish a condition that the actual customer information be provided through separate authentication and a condition that the actual customer information be provided to selected terminals.

Thus, the actual customer information can be safely managed and used for electronic commerce, thereby resolving an issue of electronic commerce reduction due to a customer information security issue.

A seller may acquire buyer information and build his or her own database for direct transaction. This is because the seller generally acquires the buyer information and builds a database for such information to request delivery. According to an exemplary embodiment of the present invention, a unique number is provided to the seller except for absolutely necessary information, thereby resolving problems caused by providing actual customer information to the seller. If the actual customer information must be provided to the seller terminal, an actual address may be provided as information incapable of being stored and transmitted.

When the management server 200 is not normally connected with the integrated customer information DB 400, i.e., when the first server 210 is disconnected from the second server 220, the management server 200 may temporarily store the actual customer information in a separate temporary table and then store the temporarily stored actual customer information in the integrated customer information DB 400 when the first server 210 is normally connected with the second server 220.

Meanwhile, when an external terminal, e.g., the seller terminal 100, the buyer terminal 500 or the service provider terminal 600) requests the customer information, the management server 200 provides the unique number stored in the customer information DB 300, and provides the actual customer information corresponding to the unique number stored in the integrated customer information DB 400 under a security condition.

The security condition may be applied in various ways.

First, when the service provider terminal 600 requests the customer information, the management server 200 provides the unique number stored in the customer information DB 300. If the service provider terminal 600 is a delivery server, the delivery server is provided with only the unique number rather than the actual customer information.

That is, when customer address information is necessary, it is provided under the security condition. For example, only the unique number is delivered in processing delivery information, and when the actual customer information is necessarily required, the actual customer information may be provided with a security condition that the actual customer information be capable of being printed or output on a screen but not transmitted or stored.

More specifically, when the seller terminal 100 instructs to deliver the goods to a buyer-desired destination according to a successful contract between the seller terminal 100 and the buyer, the seller terminal 100 may deliver a unique number of the destination to the delivery server together with identifiers, such as a contract-related identification number and an invoice number. Thus, the seller terminal does not have the actual buyer information. Meanwhile, since the delivery server can deliver goods using the actual customer information, the delivery server requests the management server 200 to provide the actual customer information corresponding to the unique number. In this case, the delivery server transmits the unique number to the management server 200 together with the identifiers, such as a contract-related identification number and an invoice number. Upon receipt of such information, the management server 200 confirms the successful contract from the contract-related identification number and then delivers the actual customer information to the delivery server. In this case, security can be strengthened so that the delivery server is allowed only to read and print the actual customer information, but not to store or transmit the actual customer information. Thus, when an external terminal requests the customer information, the management server 200 returns only the unique number and provides the actual customer information only if the external terminal is authorized to receive the actual customer information. If the actual customer information is requested by an authorized entity (a buyer or a seller), the actual customer information may be provided as information capable of being stored and transmitted. Otherwise, the actual customer information may be provided as information capable of being only read and printed.

Many Internet hacking issues, such as leakage of mass customer information, have occurred. In the present invention, the actual customer information is incapable of being stored and transmitted, thereby improving information security.

Meanwhile, when a terminal requests the actual customer information corresponding to the unique number, it is desirable that the management server 200 strengthen authentication for the requesting terminal. That is, when an external terminal requests customer information, the management server 200 may provide the unique number as the customer information capable of being easily stored and transmitted by the external terminal. However, when the external terminal requests the actual customer information, the management server 200 provides the actual customer information with strengthened security, i.e., capable of being only output on a screen.

The unique number may be changed at uniform time intervals. If the actual customer information is used with the corresponding unique number for a predetermined period, the unique number may act as a new type of customer identifier.

Also, the security condition is that actual customer information as information capable of being stored and transmitted be provided to an authorized terminal, and the actual customer information as information incapable of being stored and transmitted be provided to other terminals.

Meanwhile, in an exemplary embodiment of the present invention, the management server 200 is implemented as including the first and second servers 210 and 220, but is not limited thereto. The first and second servers 210 and 220 may be implemented by one integrated management server 200.

In this case, the integrated management server 200 receives actual customer information from the terminal 100, 500 or 600 connected over the Internet 10, creates a unique number for each customer corresponding to the actual customer information, and stores the created unique number for each customer and the corresponding actual customer information in the customer information DB 300 and the integrated customer information DB 400, respectively.

Meanwhile, although not shown, a web server is included in the management server 200 or provided as a separate entity. The web server may connect the seller terminal 100, the buyer terminal 500, and the service provider terminal 600 to the management server 200 over the Internet 10 and provide a variety of web services of the management server 200 managing the on-line shopping mall through a specific web page.

The system may further include a backup integrated customer information DB (not shown) interworking with the integrated customer information DB 400 and storing actual customer information corresponding to each unique number stored in the integrated customer information DB 400 in synchronization with the integrated customer information DB. When the integrated customer information DB 400 is abnormal, the management server 200 may be connected to the backup integrated customer information DB.

The customer information DB 300 stores only the unique number for each customer created by the management server 200, and the integrated customer information DB 400 stores the actual customer information corresponding to the unique number for each customer created by the management server 200 in an integrated manner.

The customer information stored in the customer information DB 300 and the integrated customer information DB 400 and a stored format will be described in detail with reference to FIGS. 2a and 2b.

The actual customer information stored in the customer information DB 400 may include, for example, a customer number, a resident registration number, a home telephone number, a company telephone number, a mobile phone number, a company address, a home address, a card number, a password, destination address 1, destination address 2, a destination telephone number, etc. The actual customer information may include a unique number corresponding to the customer number. The actual customer information may include the unique number instead of the customer number. It is understood that the actual customer information is not limited thereto, but may include various types of customer information.

Figure 2A:
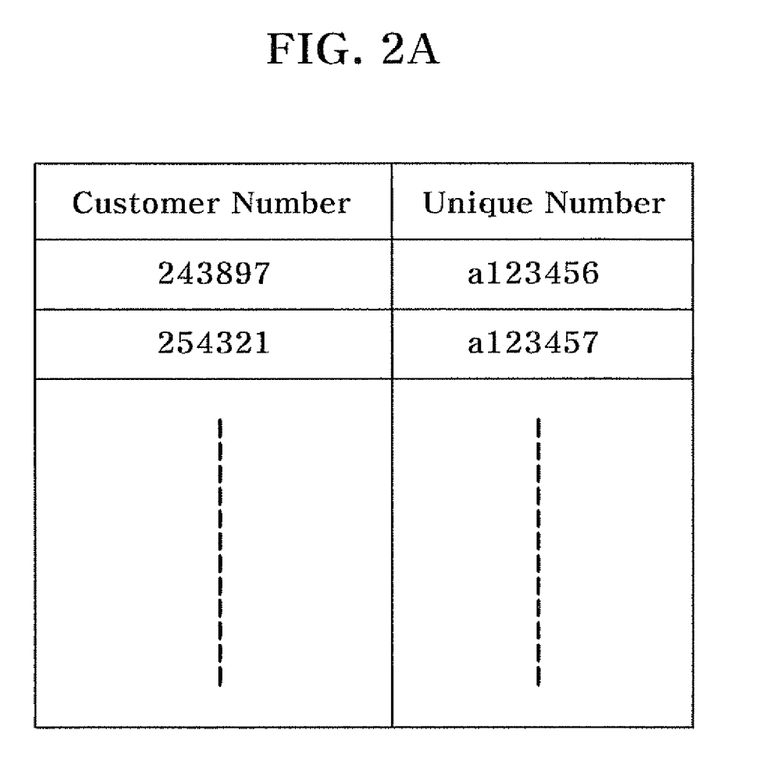
FIGS. 2a to 2c illustrate examples in which a resident registration number, a home telephone number, and a company telephone number corresponding to a unique number for each customer are stored in a customer information DB and an integrated customer information DB.
Figure 2B:
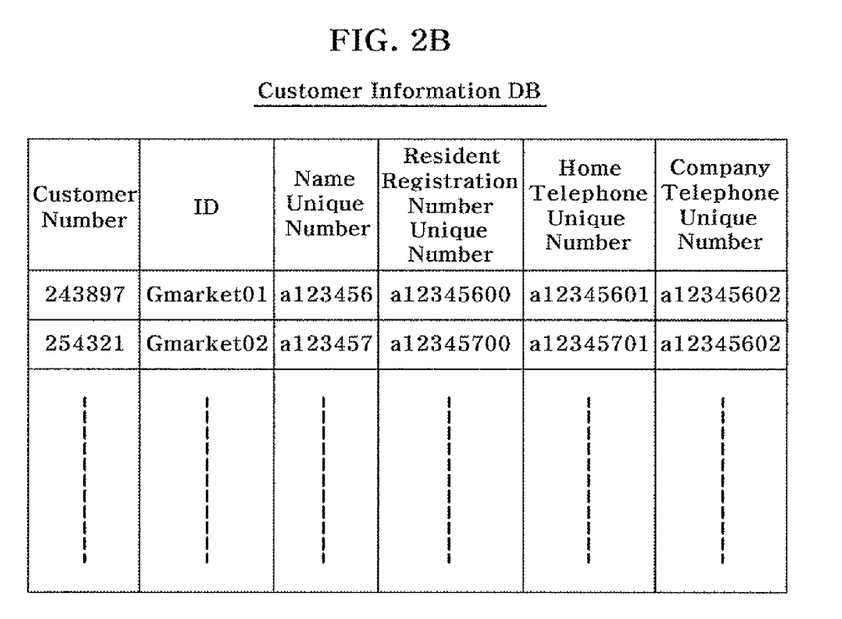
Figure 2C:
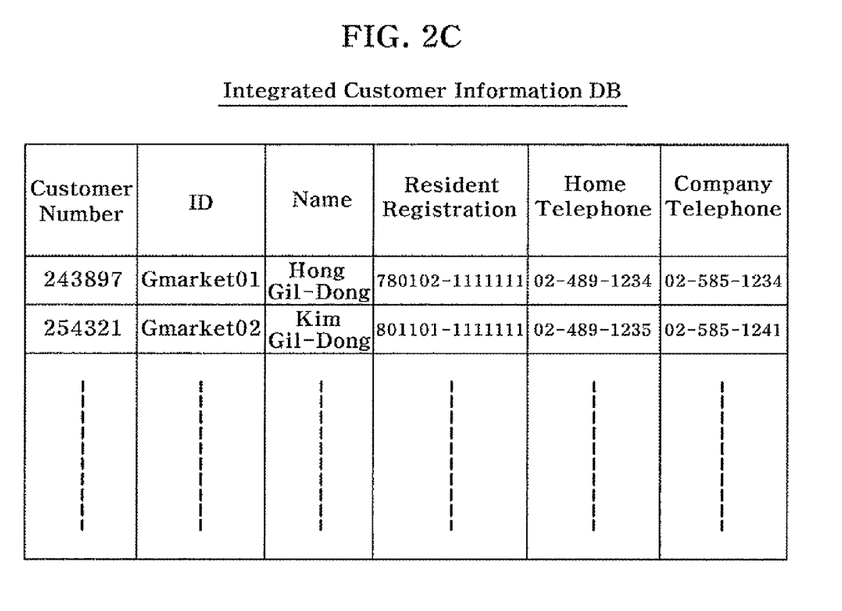

FIGS. 2a to 2c illustrate examples in which a resident registration number, a home telephone number, and a company telephone number corresponding to a unique number for each customer are stored in the customer information DB 300 and the integrated customer information DB 400.

Referring to FIG. 2a, one unique number corresponding to the customer number exists. The customer number may be used as the unique number. Since the unique number is desirably changed at uniform time intervals, the customer number may differ from the unique number. The customer number is not particularly limited, other than that it should specify the user, and may be an ID or another separate character code.

Referring to FIG. 2b, the customer information DB 300 includes different unique numbers according to a customer address, a customer telephone number, a customer resident registration number, and the like. That is, the unique numbers may be created by setting a unique number of a man named "Hong Gil-Dong" to seven digits, a123456, adding "00" for the resident registration number unique number, "01" for the home telephone unique number, "02" for the company telephone unique number, and "03" for the mobile phone unique number. Such suffixes are added as shown in FIG. 2b to build the DB, or only the unique number is stored in the DB and suffixes are separated using a program to determine whether the suffix indicates a resident registration number or a home telephone. In case of the former, the database becomes larger.

Thus, the distinct customer information is provided to the external terminal, thereby preventing unnecessary customer information from being provided. For example, when the delivery server requests actual destination address information of the customer, other information of the customer need not be provided, thereby strengthening the security.

A method for using customer information in electronic commerce using the Internet according to an exemplary embodiment of the present invention will be described in detail.

Figure 3:
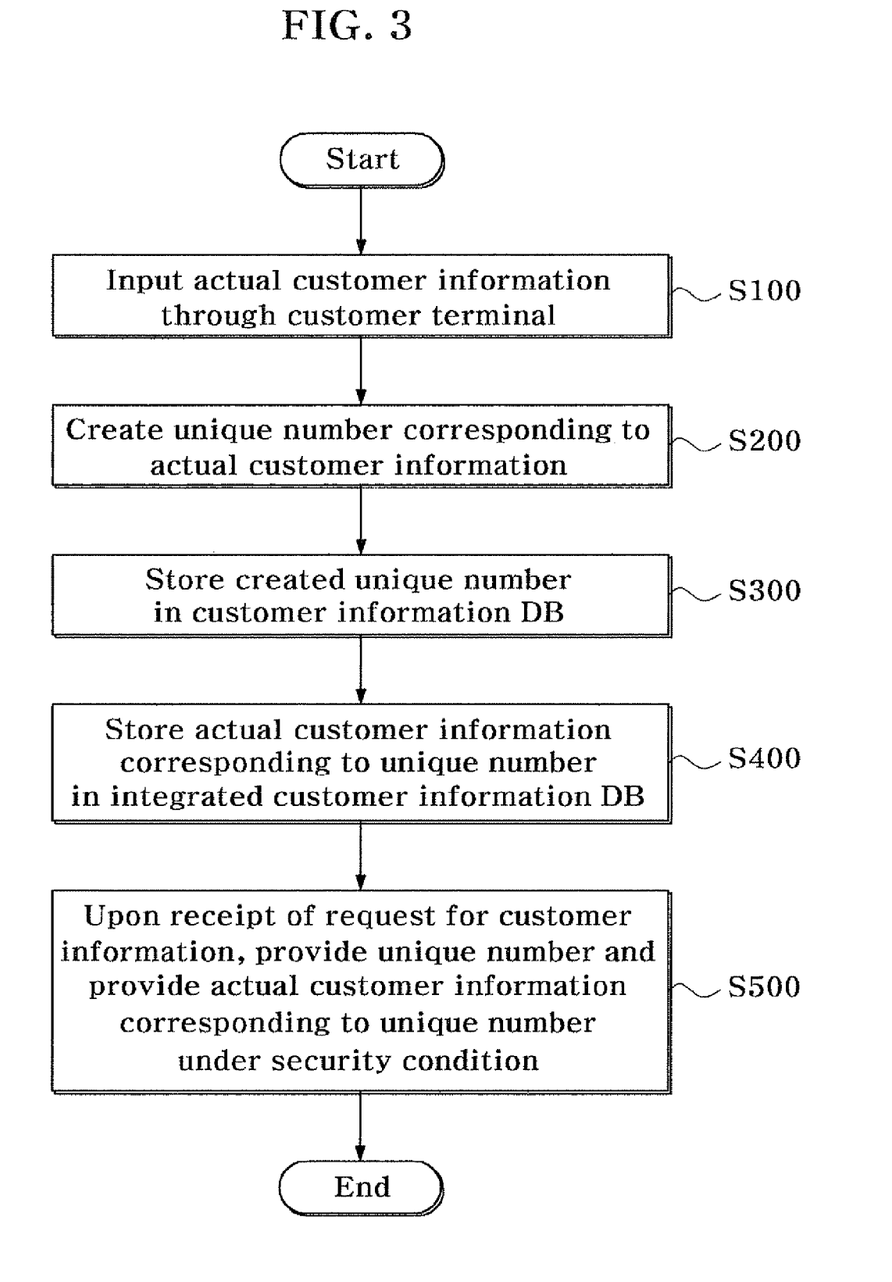
FIG. 3 is a flowchart illustrating a method for using customer information in electronic commerce using the Internet according to an exemplary embodiment of the present invention.

FIG. 3 is a flowchart illustrating a method for using customer information in electronic commerce using the Internet according to an exemplary embodiment of the present invention. Unless otherwise indicated, the management server 200 performs the method.

Referring to FIGS. 1 to 3, first, after accessing the management server 200 connected to the Internet 10 through the seller terminal 100, the buyer terminal 500 or the like, the customer (a seller or a buyer) inputs his or her actual customer information according to several situations (e.g., member subscription/modification, delivery, order, and message service) (S100). The actual customer information may be, for example, a resident registration number, a home telephone number, a company telephone number, a mobile phone number, a company address, a home address, a card number, a password, destination address 1, destination address 2, a destination telephone number, etc., as described above.

The management server 200 then receives the actual customer information, creates a unique number for each customer corresponding to the actual customer information (S200), stores the created unique number for each customer in the customer information DB 300 (S300), and stores the actual customer information corresponding to the unique number for each customer in the integrated customer information DB 400 (S400).

Meanwhile, upon receipt of a request for customer information from the seller terminal 500 or the service provider terminal 600, the management server 200 provides the unique number stored in the customer information DB 300 and provides the actual customer information corresponding to the unique number under a security condition (S500).

The security condition may be strengthened authentication or actual customer information access by only limited terminals. Meanwhile, the actual customer information may be provided by searching for the unique number corresponding to the requested customer from the customer information DB 300, extracting the actual customer information corresponding to the searched unique number from the integrated customer information DB 400 and transmitting the actual customer information to the terminal.

It is understood that the management server 200 must have a function of determining whether to provide the unique number stored in the customer information DB 300 or the actual customer information stored in the integrated customer information DB 400. For example, an identifier (an invoice number, a contract-related number, and the like for delivery) together with the unique number may be confirmed to provide the actual customer information. If an entity providing the actual customer information requests the actual customer information, the management server 200 may return the actual customer information as information capable of being stored and transmitted, and otherwise, the management server 200 may provide the actual customer information under a condition, i.e., as information capable of being only read and printed.

When the actual customer information stored in integrated customer information DB 400 is requested, the management server 200 may search for a unique number corresponding to the requested customer from the integrated customer information DB 400, extract actual customer information corresponding to the searched unique number from the integrated customer information DB 400, and transmit the actual customer information to the seller terminal 100 or the buyer terminal 500. The actual customer information corresponding to the searched unique number from the integrated customer information DB 400 may be extracted by storing a customer number or a unique number in the integrated customer information DB 400 and referring to the integrated customer information DB 400 to identify the actual customer information.

When seller and buyer information input from the seller terminal 100 and the buyer terminal 500 match, the management server 200 creates one unique number, stores the created unique number in the customer information DB 300, and stores the actual customer information corresponding to the unique address number in the integrated customer information DB 400.

When the integrated customer information DB 400 is abnormal, the management server 200 may be connected to a backup integrated customer information DB (not shown) interworking with the integrated customer information DB 400 and storing actual customer information corresponding to each unique number stored in the integrated customer information DB 400 in synchronization with the integrated customer information DB.

Meanwhile, the method for using customer information in electronic commerce using the Internet according to an exemplary embodiment of the present invention can be implemented as computer-readable code in a computer-readable recording medium. The computer-readable recording medium is any recording medium for storing data that can be read by a computer system.

Examples of the computer-readable recording medium include a read-only memory (ROM), a random access memory (RAM), a compact disk-read only memory (CD-ROM), a magnetic tape, a hard disk, a floppy disk, mobile storage, a non-volatile memory (a flash memory), and optical data storage. Alternatively, the medium may be implemented in a format of carrier waves (e.g., Internet transmission).

The computer-readable recording medium may be distributed among networked computer systems, and the computer-readable code may be stored and executed in a decentralized manner.

According to the present invention as described above, actual customer information is received from a customer terminal connected over the Internet, the unique number corresponding to the actual customer information is created, and the created unique number and the corresponding actual customer information are stored and managed in separate databases, thereby effectively preventing the actual customer information from being leaked by hackers or malicious programs.

A hacker, who hacks a customer information DB of an on-line shopping mall website cannot acquire complete actual customer information and misuse the actual customer information because only the unique number for each customer is stored in the customer information DB, thereby effectively guaranteeing safety of the actual customer information.

Only the unique number is provided when the actual customer information is unnecessary, and the actual customer information is capable of being read and printed under a strengthened security condition, thereby effectively using the customer information.

Electronic commerce can be performed without leaking the actual customer information, thereby further activating electronic commerce using customer information.

Also, information required for electronic commerce is delivered with the actual customer information substituted by the unique number, thereby reducing a data transmission amount, particularly in mobile electronic commerce.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system comprising:
a separate customer information database (DB) configured to store a unique number for each customer;
an integrated customer information DB configured to store customer information corresponding to the unique number in an integrated manner; and
a management server configured to provide the unique number stored in the separate customer information DB and provide the customer information from the integrated customer information DB corresponding to the unique number under a security condition when an external terminal requests customer information, the management server being further configured to provide access to the separate customer information DB and the integrated customer information DB through different manager accounts, the management server being configured to provide access to the separate customer information DB through a first manager account but prevent access to the separate customer information DB through a second manager account different from the first manager account, the management server being configured to provide access to the integrated customer information DB through the second manager account but prevent access to the integrated customer information DB through the first manager account, and the management server being further configured to change the unique number stored in the separate customer information DB at uniform time intervals.

2. A system comprising:
a separate customer information DB storing a unique number for each customer;
an integrated customer information DB storing customer information corresponding to the unique number in an integrated manner; and
a management server configured to determine whether to provide the unique number or the customer information when an external terminal requests customer information via a request, to provide the unique number stored in the separate customer information DB when it is determined that the unique number is to be provided, and to provide the customer information from the integrated customer information DB corresponding to the unique number when it is determined that the customer information is to be provided, the management server being further configured to provide access to the separate customer information DB and the integrated customer information DB through different manager accounts, the management server being configured to provide access to the separate customer information DB through a first manager account but prevent access to the separate customer information DB through a second manager account different from the first manager account, the management server being configured to provide access to the integrated customer information DB through the second manager account but prevent access to the integrated customer information DB through the first manager account, and the management server being further configured to change the unique number stored in the separate customer information DB at uniform time intervals.

3. The system of claim 2, wherein the management server determines whether the request is made by an entity providing the customer information, and provides the customer information when it is determined that the request is made by the entity providing the customer information and the unique number when it is determined that the requested is not made by the entity providing the customer information.

4. The system of claim 2, wherein when identifier information is received together with the unique number from the external terminal, the management server provides the customer information when the identifier information satisfies a predetermined condition.

5. The system of claim 1, wherein the management server comprises:
a first server receiving the customer information from a terminal connected over the computer network, creating a unique number for each customer corresponding to the customer information, and storing the unique number for each customer in the separate customer information DB; and
a second server receiving the customer information corresponding to the unique number for each customer created by the first server and storing the customer information in the integrated customer information DB.

6. The system of claim 1, wherein the management server temporarily stores the customer information in a separate temporary table when the management server is not connected with the integrated customer information DB, and then stores the temporarily stored customer information in the integrated customer information DB when the management server is connected with the integrated customer information DB.

7. The system of claim 1, further comprising a backup integrated customer information DB interworking with the integrated customer information DB and storing the customer information corresponding to each unique number stored in the integrated customer information DB in synchronization with the integrated customer information DB, wherein the management server is connected to the backup integrated customer information DB when the integrated customer information DB is not connected.

8. The system of claim 1, wherein the separate customer information DB includes different unique numbers according to a customer address, a customer telephone number, and a customer resident registration number, and the integrated customer information DB stores the customer information corresponding to each unique number in an integrated manner.

9. A method comprising:
receiving, by a management server, input customer information;
creating, by the management server, a unique number for a customer corresponding to the customer information;
storing, by the management server, the created unique number for the customer in a separate customer information DB and separately storing the customer information corresponding to the unique number in an integrated customer information DB;
providing, by the management server, the unique number stored in the separate customer information DB and providing the customer information from the integrated customer information DB corresponding to the unique number under a security condition when an external terminal requests customer information, the management server providing access to the separate customer information DB and the integrated customer information DB through different manager accounts, the management server providing access to the separate customer information DB through a first manager account but preventing access to the separate customer information DB through a second manager account different from the first manager account, and the management server providing access to the integrated customer information DB through the second manager account but preventing access to the integrated customer information DB through the first manager account; and
changing, by the management server, the unique number stored in the separate customer information DB at uniform time intervals.

10. A method comprising:
receiving, by a management server, input customer information;
creating, by the management server, a unique number for a customer corresponding to the customer information;
storing, by the management server, the created unique number for the customer in a separate customer information DB and separately storing the customer information corresponding to the unique number in an integrated customer information DB;
determining, by the management server, whether to provide the unique number or the customer information when an external terminal requests customer information, providing the unique number stored in the separate customer information DB when it is determined that the unique number is to be provided, and providing the customer information from the integrated customer information DB corresponding to the unique number when it is determined that the customer information is to be provided, the management server providing access to the separate customer information DB and the integrated customer information DB through different manager accounts, the management server providing access to the separate customer information DB through a first manager account but preventing access to the separate customer information DB through a second manager account different from the first manager account, and the management server providing access to the integrated customer information DB through the second manager account but preventing access to the integrated customer information DB through the first manager account; and changing, by the management server, the unique number stored in the separate customer information DB at uniform time intervals.

11. The method of claim 9, wherein the separate customer information DB includes different unique numbers according to a customer address, a customer telephone number, and a customer resident registration number, and the integrated customer information DB stores the customer information corresponding to each unique number in an integrated manner.

12. The method of claim 9, further comprising creating, by the management server, one unique number when customer information for a seller and a buyer input from the terminals match, storing the created unique number in the separate customer information DB, and storing the customer information corresponding to the unique number in the integrated customer information DB.

13. The method of claim 9, wherein the determining whether to provide the unique number or the customer information further comprises temporarily storing, by the management server, the customer information in a separate temporary table when the management server is not normally connected with the integrated customer information DB, and then storing the temporarily stored customer information in the integrated customer information DB when the management server is normally connected with the integrated customer information DB.

14. A non-transitory computer-readable recording medium having a program stored thereon, the program having software instructions for executing a method comprising:
receiving input customer information;
creating a unique number for a customer corresponding to the customer information;
storing the created unique number for the customer in a separate customer information DB and separately storing the customer information corresponding to the unique number in an integrated customer information DB;
providing the unique number stored in the separate customer information DB and providing the customer information from the integrated customer information DB corresponding to the unique number under a security condition when an external terminal requests customer information, providing access to the separate customer information DB and the integrated customer information DB through different manager accounts, providing access to the separate customer information DB through a first manager account but preventing access to the separate customer information DB through a second manager account different from the first manager account, and providing access to the integrated customer information DB through the second manager account but preventing access to the integrated customer information DB through the first manager account; and
changing the unique number stored in the separate customer information DB at uniform time intervals.

15. The non-transitory computer-readable recording medium of claim 14, wherein the customer information comprises at least one of the following:
a resident registration number, a home telephone number, a company telephone number, a mobile telephone number, a company address, a home address, a card number, a destination address, a destination telephone number, or any combination thereof.

* * * * *

UNITED STATES PATENT AND TRADEMARK OFFICE
CERTIFICATE OF CORRECTION

PATENT NO. : 10,095,884 B2
APPLICATION NO. : 12/570738
DATED : October 9, 2018
INVENTOR(S) : Young Bae Ku Page 1 of 1

It is certified that error appears in the above-identified patent and that said Letters Patent is hereby corrected as shown below:

On the Title Page

Item (65), in Column 1, in "Prior Publication Data", Line 2, below "Apr. 8, 2010" insert:
-- (30)  Foreign Application Priority Data
Oct. 6, 2008  (KR) ............................. 2008-0097548 --

Signed and Sealed this
Twelfth Day of February, 2019

Andrei Iancu
*Director of the United States Patent and Trademark Office*